(12) United States Patent
Wang et al.

(10) Patent No.: US 8,924,354 B2
(45) Date of Patent: Dec. 30, 2014

(54) BLOCK LEVEL DATA REPLICATION

(75) Inventors: Hector Wang, Beijing (CN); Haiyang Zhang, Beijing (CN); Shaorong Li, Beijing (CN); Guoxian Shang, Beijing (CN)

(73) Assignee: CA, Inc., New York, NY (US)

( * ) Notice: Subject to any disclaimer, the term of this patent is extended or adjusted under 35 U.S.C. 154(b) by 547 days.

(21) Appl. No.: 13/018,934

(22) Filed: Feb. 1, 2011

(65) Prior Publication Data

US 2012/0197844 A1    Aug. 2, 2012

(51) Int. Cl.
*G06F 7/00*    (2006.01)
*G06F 17/00*    (2006.01)
*G06F 11/14*    (2006.01)

(52) U.S. Cl.
CPC .................................. *G06F 11/1464* (2013.01)
USPC .......................................... 707/646; 707/647

(58) Field of Classification Search
None
See application file for complete search history.

(56) References Cited

U.S. PATENT DOCUMENTS

| | | | |
|---|---|---|---|
| 6,952,758 B2* | 10/2005 | Chron et al. | 711/162 |
| 7,055,008 B2* | 5/2006 | Niles et al. | 711/162 |
| 7,415,653 B1* | 8/2008 | Bonwick et al. | 714/763 |
| 7,512,643 B2* | 3/2009 | Kobayashi et al. | 1/1 |
| 8,041,677 B2* | 10/2011 | Sumner et al. | 707/640 |
| 8,200,638 B1* | 6/2012 | Zheng et al. | 707/679 |
| 2003/0018878 A1* | 1/2003 | Dorward et al. | 711/216 |
| 2006/0218135 A1* | 9/2006 | Bisson et al. | 707/4 |
| 2010/0179941 A1* | 7/2010 | Agrawal et al. | 707/624 |

OTHER PUBLICATIONS

Liguori et al, "Experiences with Content Addressable Storage and Virtual Disks", Proceedings of the workshop on I/O 2008, 6 pages.*
Mahalingam et al, "Towards a Semantic, Deep Archival File System", IEEE 2003, 7 pages.*

* cited by examiner

*Primary Examiner* — Uyen Le
(74) *Attorney, Agent, or Firm* — Pillsbury Winthrop Shaw Pittman LLP

(57) ABSTRACT

Systems and methods for replicating data from a production server to a backup server include identifying one or more data blocks of a file that were modified after a first time instant and before a second time instant. The file may be associated with a protected directory of the production server. An representative data block (e.g., including a hash value) for at least one of the identified data blocks may be computed using a cryptography algorithm, e.g., MD5 or SHA-1. The computed cryptographic data block representing the identified data block may then be sent for replication to the backup server. An operation performed between the first time instant and the second time instant on one or more files of the protected directory may be recorded, and sent to the backup server.

35 Claims, 2 Drawing Sheets

BLOCK LEVEL DATA REPLICATION

FIELD OF THE INVENTION

The invention generally relates to data backup and recovery, and more particularly to block level data backup and replication.

BACKGROUND OF THE INVENTION

Data replication for backup and recovery purposes is generally achieved by creating a shadow copy of a storage volume, e.g., in a server. Such replication may be done, for example, using Volume Shadow Copy Service (VSS) utility of the Windows™ operating system. A VSS command may be issued to take a volume snapshot periodically such as, for example, every fifteen minutes, to ensure that all application data and data in a cache memory in the file system are flushed to disk.

However, such volume-level snapshot and replication techniques may not be usable for operating systems such as UNIX, Linux, for example. Additionally, volume-level snapshots may not provide specific structural and/or organizational details of the file system maintained within the operating system. Accordingly, in the event where data of only particular files are changed due to one or more operations, volume-level snapshots may not provide enough resolution to identify only the specific modified files or modified data blocks in the files for replication. Rather, in the absence of a sense of the file system, data of the complete volume may have to be replicated, or in the case where operational changes on some specific files are to be reversed, data of the complete replicated volume (and not just that of the specific files) may have to be used for data restoration. This may result in additional processing burden and increased network traffic within the data replication system.

Additionally, even if data replication is performed by comparing two snapshots on a file-by-file or directory-by-directory basis, and sending the differences to a backup system or server, the replication process may be very slow and data-traffic intensive, thereby negatively impacting the performance of the replication system.

Thus, to address the above-discussed problems, it is desirable to develop and provide an improved replication process that may be implemented on wide range of operating systems without slowing down, or otherwise negatively impacting the replication process.

SUMMARY

In some implementations, the invention provides systems and methods for data replication from a master server (e.g., a production server) to a replica server (e.g., a backup server). Systems and methods described herein provide mechanisms that relate to identifying data blocks that may have changes betweens two (e.g., consecutive) time instances, employing a cryptography algorithm to process an identified data block and generate a representative data block corresponding to the identified data block, and sending the representative data block to the replica server. In some implementations, the representative data block may have a smaller size (in terms of number of bytes) than the corresponding data block it was generated from. This may result in reduced data traffic between the master and replica servers. Additionally, such data block level replication mechanism may be implementable for various operating system such as UNIX, Linux, Windows™, etc.

A system for data replication may include a master application, which may reside in or otherwise be operatively associated with the master server. The master application may be or include a computer application (or plurality of applications capable of communicating with one another) having one or more modules thereon, which when executed, perform data replication from a master server to a replica server.

In some implementations, the one or more modules may include instructions causing one or more processors to identify one or more data blocks of at least one file that were modified after a first time instant and before a second time instant. The file may be associated with a protected directory of the master server. In some implementations, at least one of the identified one or more data blocks may be processed using a cryptography algorithm to generate an representative data block, e.g., including a hash value. Depending on the cryptography algorithm, the size of the representative data block may be fixed or variable, or greater and smaller as compared to the size of the corresponding identified data block.

Before sending the representative data block to the replica server, a determination may be made as to whether the representative data block is identical to one of a plurality of pre-computed representative data blocks at the master server, and if so, only the representative data block may be sent to the replica server. However, if it is determined that the representative data block is not identical to any of the plurality of pre-computed representative data blocks, both the representative data block and the corresponding identified data blocks which was used to generate the representative data block may be sent to the backup server. Additionally, the representative data block may be added to the plurality of pre-computed representative data blocks, so that it may be used for further comparison with other representative data blocks.

In some implementations, a plurality of pre-computed representative data blocks and their corresponding decrypted counterparts may be stored in a memory associated with the replica server. Accordingly, at the replica server, a determination may first be made whether the received representative data block (representing the modified data block at the master server) is identical to any of the plurality of pre-computed representative data blocks at the replica server. If a match is found, the corresponding decrypted data block may be retrieved from the memory. In some implementations, this retrieved decrypted data block represents and is thus stored at the replica server as a replication of the modified data block at the master server.

However, if no match is found for the representative data block at the replica server, the representative data block may be added to the plurality of pre-computed representative data blocks at the replica server. Additionally, in this case, because it is determined that the received representative data block and thus the corresponding decrypted data block were not already available at the replica server, an identified data block corresponding to the representative data block may also be received from the master server for replication at the replica server. The one or more processors may be further configured to perform other features and/or functions.

In some implementations, the invention provides a method for data replication from a master server to a replica server. In some implementations, the invention may include a tangible computer readable storage media having computer or processor-executable instructions thereon, that when executed by one or more processing devices, may configure the one or more processing devices to perform one or more of the features and functions described herein.

These and other objects, features, and advantages of the invention will be apparent through the detailed description and the drawings attached hereto. It is also to be understood that both the foregoing general description and the following detailed description are exemplary and not restrictive of the scope of the invention.

DETAILED DESCRIPTION OF THE INVENTION

Figure 1:
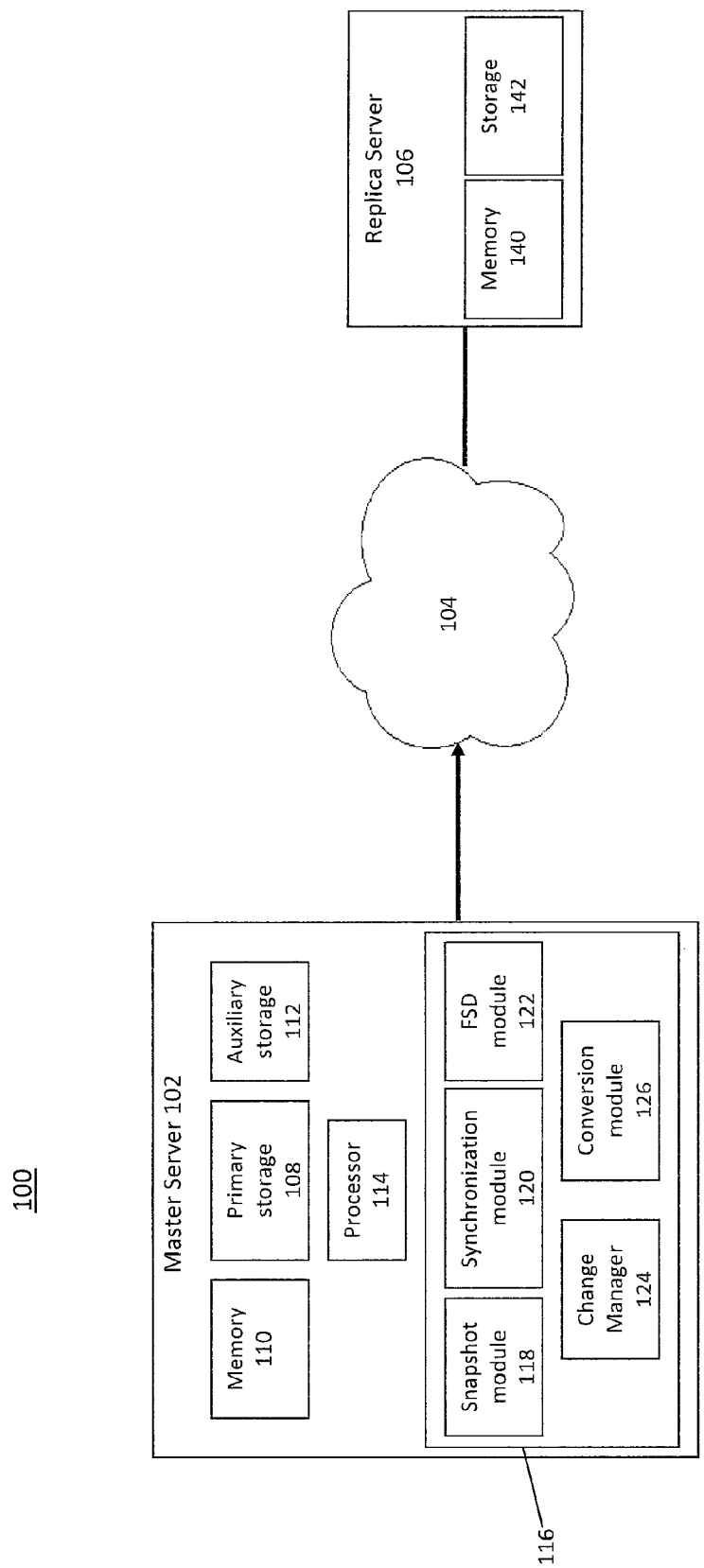
FIG. 1 illustrates an example of an environment that includes a system for performing data replication, according to various implementations of the invention.

In some implementations, the invention provides systems and methods for data replication from a master server to a replica server. FIG. 1 illustrates an example of an environment 100 in which a system for performing data replication resides. As depicted in FIG. 1, environment 100 includes a system for replicating data from a master server (e.g., a production server) to a replica server (e.g., a backup server). The system in the environment 100 may include a master server 102 communicatively coupled, via a network 104, to a replica server 106. Although only one master server 102 and replica server 106 is shown in FIG. 1, this is for illustrative purposes only. In some implementations, there may be a plurality of master servers 102 and/or a plurality of replica servers 106 connected via one or more networks 104 or otherwise connected to one another. Master server 102 may store data to be backed-up or replicated (e.g., periodically or on-demand) to ensure that critical applications and data are available during outages. Outages may be planned (e.g., system maintenance), or unplanned (e.g., human error, viruses and other malware and natural disasters). Data considered for replication (i.e., replicated or protected data) may include or may be associated with data items operated on or updated by one or more components or functions of master server 102. Such data items may include one or more data files or one or more directories or other data items stored in a storage of master server 102, and may be sent to replica server 106 for replication. Replica server 106 may be acting as a backup server to the master server 102. After an initial backup and replication (i.e., synchronization) of data items to be protected, further operations on the data items may be recorded as events, which may be consolidated and sent to replica server 106. The recorded events may be consolidated at master server 102, for example, using techniques described in U.S. patent application Ser. No. 12/775,066, entitled "Journal Event Consolidation," which is incorporated by reference herein in its entirety. In some implementations, the operations or events are recorded at master server 102 without recording the data associated with the operations (i.e., changes to the data items). However, data blocks or files affected by the operations may be identified at master server 102, and the identified data blocks may be processed to generate representative data blocks, which may be sent to replica server 106 along with or after sending the consolidated event(s). This mechanism of using representative data blocks (that represent the modified or affected data blocks) in conjunction with the consolidated events to replicate data or update replicated data may reduce data redundancy in the replication process. As such, replication and recovery speed may be increased, and CPU usage and network overhead may be reduced.

Network 104 may include the Internet and/or other networks. It will be appreciated that this is not intended to be limiting, and that the scope of this disclosure includes implementations in which the master server 102 and the replica servers 106 are operatively linked via some other communication methodology, e.g., via a direct wired or wireless connection. In some implementations, environment 100 may include one or more elements other than master server 102 and replica server 106 (not shown). These other elements may include one or more servers, desktops, laptops, workstations, wireless devices (e.g., smartphones, personal digital assistants, etc.), routers, switches, and/or other network or other devices.

In some implementations, master server 102 may include a primary storage 108, a memory 110, an auxiliary storage 112 and/or other elements. Although storages 108, 112, and memory 110 (collectively referred to as the "storage units") are depicted as separate components in master server 102, they may be combined in one or two storage units. One or more of storage units 108, 110 and 112 may comprise electronic storage media that electronically stores information. Such electronic storage media may be provided integrally (i.e., substantially non-removable) to master server 102 and/ or as removable storage that is removably connectable to master server 102 via, for example, a port (e.g., a USB port, a firewire port, etc.) or a drive (e.g., a disk drive, etc.). Storage units 108, 110 and 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media.

Primary storage 108 may store the protected data (e.g., files and/or directories to be backed-up), snapshot copies of the original data related to protected files and/or directories, software algorithms, and/or other information that enables master server 102 to function as described herein. Memory 110 may store a pool or group of representative data blocks pre-computed using known data blocks of files or directories (e.g., stored at primary storage 108) at master server 102. In some implementation, memory 110 may also store copies of the known data blocks which are used to generate the pre-computed representative data blocks. Memory 110 may also store events associated with the operations on the protected data.

Auxiliary storage 112 may store data, a part of which may be received from memory 110, that may be sent to replica server 106 for replication or backup. For example, auxiliary server 106 may store data blocks that are identified as being modified by one or more operations at master server 102, representative data blocks corresponding to the modified data blocks, and data related to events or operations executed on protected data.

In some implementations, master server 102 may include a processor 114 may be configured to provide information processing capabilities in master server 102. As such, processor 114 may include one or more of a digital processor, an analog processor, a digital circuit designed to process information, an analog circuit designed to process information, a state machine, and/or other mechanisms for electronically processing information. Although processor 114 is shown in FIG. 1 as a single entity, this is for illustrative purposes only. In some implementations, processor 114 may include a plurality of processing units. These processing units may be physically located within the same device or computing platform, or processor 114 may represent processing functionality of a plurality of devices operating in coordination.

In some implementations, replica server 106 may act as a backup server to master server 102 and may include a storage 140, a memory 142, a processor (not shown) and other elements. Although storage 140 and memory 110 (collectively referred to as the "storage units") are depicted as separate components in replica server 106, they may be combined in one or two storage units. These storage units at replica server 106 may be similar to or different than the storage units (e.g., storage units 108, 110, 112) of master server 102. Replica server 106 may further include various components (not depicted in FIG. 1) such as user interfaces, processors, and so forth. Components similar to one or more of the components described above with respect to master server 102 (e.g., storage units 108, 110, 112 and processor 114) may be part of replica server 106. Such components may be used for the same or different functions as described above for master server 102.

In some implementations, master server 102 may run or operate a master application 116 for data change recordation and replication process. Master application 116 may be or include a computer application (or plurality of applications capable of communicating with one another) having one or more modules including a snapshot module 118, a synchronization module 120, a file system driver (FSD) module 122, a change manager 124, and a conversion module 126. In some implementations, the modules of master application 116 may include computer executable instructions embodied on computer readable storage media, e.g., primary storage 108. These computer executable instructions may be used to configure processor 114 of master server 102 for performing one or more features and functions, including those disclosed herein and/or other features and functions. In some implementations, master application 116 modules may be implemented across multiple applications and/or devices within environment 100 to perform the data replication features and functions described herein.

It should be appreciated that although modules 118, 120, 122, 124 and 126 are illustrated in FIG. 1 as being co-located with a single processing unit, in implementations in which processor 114 includes multiple processing units, one or more of modules 118, 120, 122, 124 and/or 126 may be located remotely from the other modules. The description of the functionality provided by the different modules, i.e., modules 118, 120, 122, 124 and/or 126 described below is for illustrative purposes, and is not intended to be limiting, as any of modules 118, 120, 122, 124 and/or 126 may provide more or less functionality than is described. For example, one or more of modules 118, 120, 122, 124 and/or 126 may be eliminated, and some or all of its functionality may be provided by other ones of modules 118, 120, 122, 124 and/or 126. As another example, processor 114 may be configured to execute one or more additional modules that may perform some or all of the functionality attributed below to one of modules 118, 120, 122, 124 and/or 126.

In some implementations, one or more components (e.g., components 110, 112, and 114) and/or modules (e.g., 116, 118, 120, 122, 124 and 126) of master server 102 may be distributed among multiple machines or may otherwise reside on one or more computing elements (e.g., servers or other machines) separate from but otherwise connected to master server 102.

In some implementations, snapshot module 118 may be configured to create a copy of at least a part of the data stored in master server 102, e.g., one or more data blocks, files, directories, or other data stored in primary storage 108. In other words, snapshot module 118 may be configured to generate data block-level, file-level or directory-level snapshots of data in primary storage 108. In some implementations, snapshot module 118 may be configured to copy data in a cache memory of master server 102. Data items copied by snapshot module 118 may be or may be related to applications that are currently running on master server 102 or any other element of the system, and/or are mission-critical. Snapshot module 118 may be configured to copy data items in a consistent state, i.e., create a shadow copy of the data items (or blocks) such that there may be no data change or update while the data items are being copied by snapshot module 118. Snapshot module 118 may store the copied data in a section of primary storage 108 or other section of master server 102 assigned or reserved for backup storage. Snapshot module 118 may create a shadow copy of data items in master server 102 periodically (e.g., every 15 minutes), or at command of a user or an administrator.

In some implementations, snapshot module 118 may be configured to invoke a command (e.g., at a first time instant) for creating a copy of protected files or directories in accordance with the file system of master server 102. The command may specify one or more files or directories that are to be copied as parameters of the command. Upon generation of such a command, the file system of master server 102 may be configured (e.g., by snapshot module 118 or processor 114) to block any further changes to any files or directories of the file system. For example, any addition, deletion, or modification of data of any files or directories may be prohibited. Also, to accommodate the copied data, snapshot module 118 in conjunction with processor 114 may create a reserved area in primary storage 108. In some implementations, the file system of master server 102 includes and manages metadata and actual data contents of the files and directories. Metadata may include directory structure and other file/directory attributes related to files or directories of the file system. Further, a file in the file system of master server 102 may have actual data content that may be separated into a plurality of data blocks, e.g., of fixed size (in terms of bytes). For example, data content of a file in master server 102 may be divided into or represented in multiple data blocks each of size equal to 8 kilobytes (KB), 16 KB, 32 KB, or any other fixed size. The data blocks may be structured in a logical layout that has a one-to-one mapping with the file's layout, such that each data block is identifiable by its logical layout identification (ID) as well as by its (actual) file layout ID. In some implementations, master server 102 may access and process data blocks using their logical layout ID, but their logical layout ID may translate the logical layout ID into file layout ID to retrieve data blocks, e.g., for sending to replica server 106 for replication.

In some implementations, snapshot module 118 may initially only copy metadata related to protected files and directories to the reserved space or area in primary storage 108. Snapshot module 118 may also record the current time (e.g., the first time instant) of copying metadata as a first check point or timestamp in primary storage 108. Such check points may be used as a state-consistency bookmark in primary storage 108 such data may be restored to a particular original state in an event of a severe system crash or failure. Thereafter, in some implementations, the file system of master server 102 may be configured (e.g., by snapshot module 118) to unblock any changes directed to the protected files, and invoke a copying application or mechanism, e.g., Copy on Write (COW), that may temporarily maintain a copy of original data of a data block in the event that data block is modified. Snapshot module 118 in conjunction with FSD module 122 may be configured to monitor any operations that are modifying data blocks of those files, and identify specific data blocks that are modified by those operations, e.g., since the first time instant. In some implementations, upon identification of the modified data blocks, snapshot module 118 may copy the corresponding original data blocks (saved, e.g., by the COW application) to the reserved area of primary storage 108 (along with metadata of the file of which those data blocks are a part). In some implementations, snapshot module 118 may be configured to unblock and continuously monitor the changes to the data blocks (and thus, copy the original data blocks to the reserved area) until the time instant of a subsequent snapshot, e.g., at a second time instant or a second check point. At the second time instant, snapshot module 118 may restart the process of copying data blocks of protected files and directories in their present state as "original" data to another or same reserved area of primary storage 108. Accordingly, data blocks copied at the second time instant provide another state-consistency bookmark which may be used for data restoration.

In some implementations, conversion module 126 may be configured to process data blocks, e.g., that are copied and stored in one or more reserved areas of primary storage 108, or data blocks of all the protected files and/or directories stored in primary storage 108, using a cryptography algorithm. For example, conversion module 126 may use a cryptography algorithm or function that produces a hash value of fixed (byte) size (e.g., using Message-Digest algorithm 5 (MD5) or a Secure Hash Algorithm-1 (SHA-1)). Additionally, or alternatively, conversion module 126 may use a cryptography algorithm that produces a hash value of variable (byte) size (e.g., Hash of Variable Length (NAVAL). Fixed hash-size cryptography functions may generate a smaller overhead for each hash value but may provide a less reliable security for the representative data blocks. In contrast, variable hash-size cryptography functions may generate a larger overhead for each hash value but may provide a more reliable security for the representative data blocks. In some implementations, representative data blocks including hash values may be stored in memory 110. In some implementations, the protected blocks may be processed using such cryptography algorithms to maintain the integrity of the data blocks, or provide a digital fingerprint of the contents of the data blocks being processed by the cryptography algorithms. Such cryptographic processing of data blocks may be used to avoid instances of "hash collision" (i.e., two different data blocks resulting in an identical representative data block having identical hash value after processing), and further may be used to ensure that the data blocks have not been altered by an intruder or virus in the process of transferring to and storing at replica server 106 for backup. Furthermore, using a particular cryptography algorithm, all data blocks containing identical data contents may be represented by a unique representative data block. In other words, that representative data block may represent all data blocks (of a same or different file) each containing identical contents. Accordingly, as is discussed in detail below, instead of sending a plurality of identical data blocks from master server 102 to replica server 106, only one representative data block (representing all those identical data blocks) may be sent to replica server 106, thereby decreasing network traffic and increasing replication speed.

In some implementations, if MD5 cryptography algorithm is used to process data blocks, the hash value for a processed data block thus generated may be of a fixed size, e.g., equal to 128 bits (or any other fixed bit or byte size). In the MD5 cryptography process, each to-be-processed data block may first be padded such that its length (or size) (in terms of number of bits) is divisible by a constant predetermined number, e.g., 512. For the padding process, first a single bit, "1" may be appended to the end of the data block followed by appending as many zeros as are required to bring the length of the data block up to a fixed number of bits, e.g., 64 bits, fewer than a multiple of the constant predetermined number, e.g., 512. The remaining bits may then be filled up with an integer, e.g., a 64-bit integer, representing the length of the original data block, in bits. Further in the MD5 process, a value that may have the size (in terms of number of bits) equal to the size of the final hash value, e.g., 128 bits may be divided into a fixed number of equal size words, e.g., four 32-bit words. These words may be initialized to certain fixed constant values. Each of the padded data block may then be processed or operated upon such that the state and/or value of one or more of the words are modified. The processing of a padded data block may include a number of similar stages (e.g., four stages), termed as rounds; each round may include or be composed of a number (e.g., 16) of similar or different operations based on a non-linear function F, modular addition, left rotation and other functions. The combined value of all the words obtained after the complete processing, i.e., after the completion of all rounds may be provided as the final hash value for the representative data block. It should be appreciated that the above-described cryptographic process is an exemplary method to process data blocks and generate representative data blocks. Other algorithms or processes associated with or corresponding to cryptography processes including, but not limited to, MD5 and SHA-1 may be used to generate a fixed-size hash value for a representative data block.

In some implementations, if a variable-size cryptography algorithm is used to generate representative data blocks including hash values, the file including the data blocks being processed may be divided into multiple blocks using, e.g., by a "sliding window" of a fixed size, e.g., 8 bytes or any other fixed size. The sliding window may be used to define boundaries for data content within the file for which a hash value may be computed. Moreover, the sliding window may be moved on a byte-by-byte basis to move the defined boundaries, and compute a new hash value. The hash value among all the computed hash values (corresponding to the sliding window positions) which is identical or equal to a pre-defined hash value may be selected as the representative hash value for the representative data block. The boundaries defined by the sliding window, if too big or too small, may be modified to increase or decrease the size of the data block of the file for which the hash value is computed.

In some implementations, synchronization module 120 may be configured to perform an initial synchronization between master server 102 and replica server 106. This initial synchronization may be initiated, e.g., after the first time instant of the snapshot recorded by snapshot module 118. The synchronization process may include comparing the snapshot data of protected files and/or directories (e.g., in primary storage 108), and data residing (e.g., in memory 142) at the replica server 106 to identify any differences and sending the differences to replica server 106. The synchronized data at replica server 106 may indicate an initial consistent state at replica server 106 and may be used as the starting point for future replications of the data changes or updates at master server 102.

In some implementations, synchronization module 120 may perform initial synchronization in different ways. For example, synchronization module 120 may compare and send all file content (i.e., data blocks) read from the snapshots created by snapshot module 118. Regardless of any file and/or directory updates or modifications that may have occurred under one or more protected directories during the synchronization, the data blocks for comparison between master server 102 and replica server 106 are read from snapshots already created by snapshot module 118 (which are affected by these changes). After comparison, data blocks representing or related to any differences between master server 102 and replica server 106 (i.e., "missing" data blocks) may also be read from the snapshots generated by snapshot module 118. Accordingly, having received the missing data blocks, replica server 106 is synchronized with master server 102 with a consistent state base corresponding to, e.g., the first time instant if the synchronization process is executed following the first time instant.

In some implementations, synchronization module 120 may be configured to utilize data stored in original relevant volumes of master server 102, instead of data from the snapshots generated by snapshot module 118, for initial synchronization. A first snapshot may be generated by snapshot module 118, which may be used by synchronization module 120, for example, to first build a directory structure including path and names of files and/or directories copied in the first snapshot taken. A point in time of the first snapshot may be recorded by FSD module 122. For comparison between master server 102 and replica server 106, synchronization module 120 may first enumerate all file and/or directory full paths from the built directory structure, and then read the file content from the original volumes that reflect the most current data changes in those files and/or directories. If a difference is identified in the data read from the original volumes and what replica server 106 stores, data corresponding to that difference are sent to replica server 106 to complete synchronization. In this instance, after synchronization, replica server 106 usually receives an inconsistent base due to file/directory changes that may have occurred in the original volumes during the synchronization process but that may not have been captured in the directory structure built from the snapshots. Accordingly, to bring replica server 106 to a consistent state, a second snapshot may be created by snapshot module 118 immediately after the initial synchronization. A point in time of the second snapshot may be recorded by FSD module 122. The second snapshot may then be later utilized in the next replication cycle to backup the data changes that occurred at master server 102 between the points in time of the first and second snapshots, or during synchronization.

In some implementations, in addition to or as an alternative to comparing and sending snapshot "missing" data blocks to replica server 106 for synchronization, synchronization module 120 may be configured to invoke conversion module 126 to compute a representative data block using the associated cryptography algorithm for each missing data block. Conversion module 126 may be configured to store the representative data blocks corresponding to the missing data blocks in auxiliary storage 112. Further, synchronization module 120 may be configured to invoke conversion module 126 to execute a de-duplication process. For the de-duplication process, conversion module 126 may be configured to compare and confirm, for each representative data block in memory 112 (and thus for each missing data block), whether a representative data block is available in memory 110 that is identical to the representative data block of memory 112. In some implementations, if such an representative data block is available in memory 110, that representative data block in addition to (or instead of) the missing data block is sent to replica server 106. At replica server 106, the received representative data block may be stored in memory 142 (along with the received missing data block). However, if such an representative data block is not available in memory 110, conversion module 126 may be configured to transfer (or copy) the representative data block from memory 112 to memory 110. Synchronization module 120 may then send the missing data block as well as the recently-transferred representative data block to replica server 106 to be stored in memory 142. In this way, it is ensured that both master server 102 (in memory 110) and replica server 106 (in memory 142) are maintaining an identical set of representative data blocks. Moreover, because replica server 106 may also store corresponding data blocks in memory 142, the representative and original data blocks may be utilized for data restoration at master server 102, if needed. In some implementations, the above-discussed de-duplication process of conversion module 126 may be used after the synchronization process for transferring the data blocks in master server 102 that are identified (e.g., by FSD module 122) as operated upon and modified to replica server 106.

In some implementations, master server 102 and replica server 106 may be configured to purge or delete their respective groups of (pre-computed) representative data blocks residing in memory 110 and memory 142, respectively. The pre-computed representative data blocks may be deleted based on one or more predetermined rules, e.g., current space available in memory 110 or memory 142. Also, when purging the representative data blocks, master server 102 may not be required to notify or send any indication to replica server 106 regarding the deletion of the data blocks. However, replica server 106 may be configured to notify master server 102 (e.g., using an acknowledgement signal or any other indicative signal) when representative data blocks are being purged from, e.g., memory 142.

In some implementations, file system driver (FSD) module 122 may capture and record any operations, changes or updates related to the data blocks of the relevant and protected files and/or directories (e.g., in primary storage 108) of master server 102. FSD module 122 may capture the data operations and/or changes in real time before or during synchronization (performed, e.g., by synchronization module 120) and between two particular time instants, e.g., between a first time instant (related to a first snapshot time) and a second time instant (related to a second snapshot time). In some implementations, FSD module 122 may record those operations and/or changes as journal events in a raw journal stored in the memory 112. In some instances, journal events may include information related to, for example, time and type of operation performed and other operation-related information. Examples of such journal events are listed in Table 1.

TABLE 1

| Type | Description |
|---|---|
| WRITE | Write data to a file |
| TRUNCATE | Truncate data from a file |
| CREATE | Create a file or directory |
| OPEN | Open a file or directory |
| CLOSE | Close a file or directory |
| CLOSE_REMOVE | Delete on close for a file or directory |
| REMOVE | Delete a file or directory |
| RENAME | Rename a file or directory |
| CHANGE_ATTR | Change the attributes or property for a file or directory |
| CHANGE_SECURITY | Change the security (e.g., ACL) for a file or directory |

In some implementations, FSD module 122 may be configured to operate in "skip written data" mode in which FSD module 122 records the events without recording the actual data associated with those events. This mode may facilitate generating and recording events with a smaller event size. For example, for events such as WRITE, CHANGE_ATTR and CHANGE_SECURITY, FSD module 122 may be configured to only record the filename, timestamp and the range of changed data, but not the actual data, in the affected file. In general, FSD module 122 may record at least operation type and time of the operation in each event type. Further, in addition to recording the operations performed on the data blocks of protected files and/or directories, e.g., between the first and second time instants, FSD module 126 may be configured to identify the data blocks that, as a result of those operations, are modified. Those identified data blocks may then be sent to replica server 106 for replication using, e.g., the above-discussed de-duplication process of conversion module 126.

In some instances, the events recorded by FSD module 122 may be redundant or become redundant after a period of time during the operation of master server 102. To reduce or remove redundancy among the already-recorded events or events being recorded in the real time by FSD module 122, change manager 124 may consolidate the events in memory 112. The consolidated events thus obtained from change manager 124 may be stored in auxiliary storage 112 before sending out to replica server 106. Change manager 124 may periodically (e.g., every 3 seconds) receive the journal events from the raw journal in memory 112 for consolidation. For certain event sets, like a set of events including multiple WRITE events, each including its respective data change range, change manager 124 may consolidate the data change range from all the WRITE events and generate a consolidated data change range to be eventually sent to the replica server 106. For example, change manager 124 may receive WRITE (3,7) and WRITE (4,10) events for a particular file indicating that new data was written, in one operation, in the file in a data change range from byte location 3 to byte location 7, and in another operation, in a data change range from byte location 4 to byte location 10, respectively. Change manager 124 may be configured to consolidate these two WRITE events to a WRITE (3, 10) event indicating that the file was updated with new data in a collective data change range from byte location 3 to byte location 10. The change manager 124 may perform such consolidation on-the-fly by consolidating the events already present at, change manager 124 with the events being received from the raw journal. In some instances, the format of the events recorded by FSD module 122 (and stored in the raw journal) may not be compatible with the format supported by change manager 124. Accordingly, change manager 124 may be associated with a journal translator (not shown in FIG. 1) which first receives journal events from the raw journal, and translates and send the events in format compatible with and/or understood by change manager 124 for consolidation.

Figure 2:
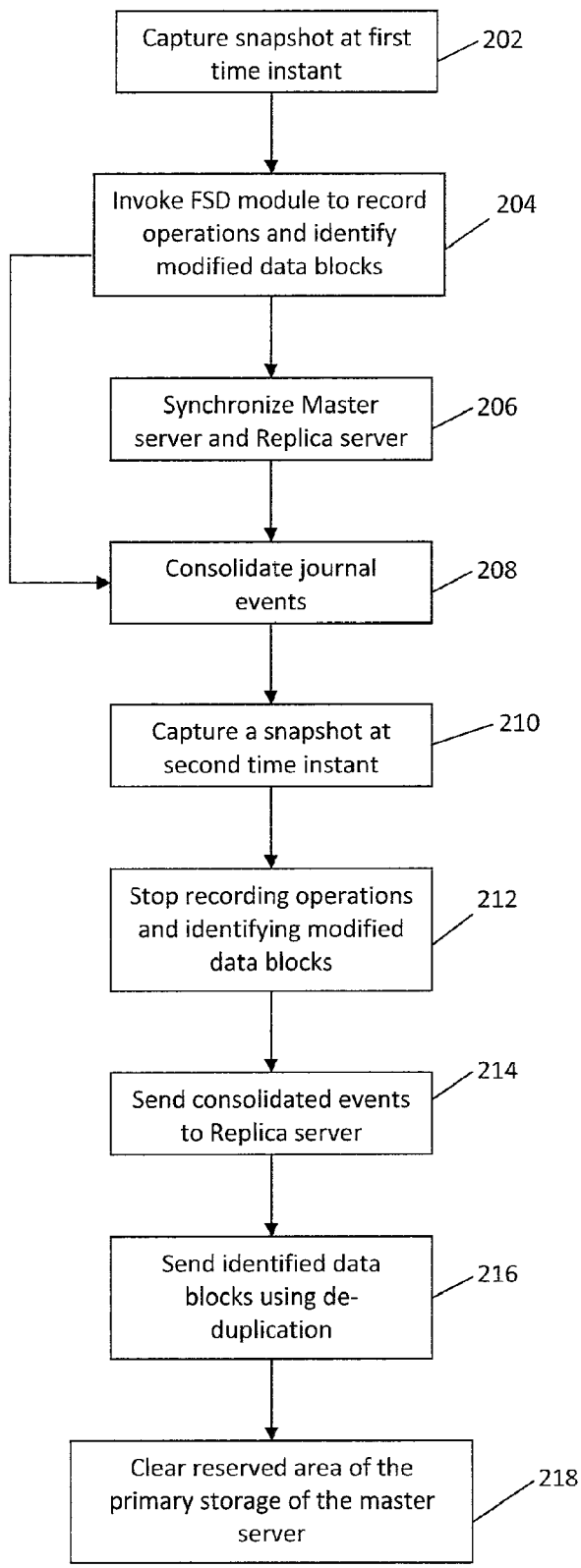
FIG. 2 illustrates an example of a method for data replication, according to various implementations of the invention.

In some implementations, the invention provides a method for data replication from a production server (e.g., master server 102) to a backup server (e.g., replica server 106). FIG. 2 illustrates a process 200, which is an example of a process for data replication from master server 102 to replica server 106. In some implementations, process 200 may be performed by one or more processors configured by computer executable instructions for performing a plurality of operations (e.g., the operations of process 200).

Process 200 includes an operation 202, wherein a snapshot of the protected files and/or directories is created at, e.g., a first time instant, by snapshot module 118 and the snapshot data (including metadata and data blocks) are stored in a reserved area of primary storage 108. A timestamp indicating the time of the snapshot (i.e., the first time instant) may also be stored in primary storage 108 with the snapshot data to be later sent to replica server 106.

In operation 204, FSD module 122 may be invoked to record operations, in a real time manner, performed on data blocks associated with protected files and/or directories after the first time instant (and before a second time instant related, e.g., to another snapshot time). As discussed above, the operations may be recorded as journal events in a raw journal residing in memory 112 to be later sent to replica server 106. For some operations such as, for example, WRITE and CHANGE_SECURITY, FSD module 122 need not record the actual data related to the operation but may only record a type of the operation, time of operation and other relevant information. However, in some implementations, FSD module 122 may be configured to identify the data blocks that are modified by the recorded operations.

After invoking FSD module 122, in an operation 206, synchronization module 120 is invoked to perform an initial synchronization between master server 102 and replica server 106. As discussed above, in this initial synchronization, the differences between the protected data stored at master server 102 and the replicated protected data at replica server 106 are determined and the missing data blocks related to the determined differences are sent to replica server 106, e.g., using the de-duplication process of conversion module 126, to bring replica server 106 to a consistent synchronized state.

In an operation 208, also after invoking FSD module 122, change manager 124 is invoked to consolidate the journal events recorded in memory 112 on an event-by-event basis (i.e., as each new event is recorded), consolidate a set of events already recorded in the memory, or a combination thereof. The consolidated events may be stored back in memory 112 until the time of the beginning of the replication phase (e.g., at the second time instant), which may coincide with the time of another snapshot by snapshot module 118. During the replication phase, the consolidated events may be transferred to replica server 106 before transferring the data blocks (using the de-duplication process).

In an operation 210, snapshot module 118 may be re-invoked to capture a snapshot of the protected files and/or directories in primary storage 108, e.g., at the second time instant. The second time instant may be set as per the predetermined replication period (which may be selected by a user through a GUI). In some implementations, the capturing of a snapshot at the second time instant may configure, in an operation 212, FSD module 122 such that FSD module stops monitoring operations and identifying modified or affected data blocks. Accordingly, change manager 124 may be invoked to consolidate all the recorded operations in memory 112, and generate a final set of consolidated events.

The final consolidated event set (or at least a part thereof) may be then sent out, in an operation 214, from auxiliary storage 112 to replica server 106 via network 104, or otherwise communicated from master server 102 to replica server 106. Additionally, FSD module 122 may insert and send the timestamp indicating the first time instant with the final consolidated event set. In some implementations, such timestamp acts as a consistency bookmark to allow replica server 106 to rewind back (i.e., undo event changes) to the consistent state which resulted from the snapshot being taken at that point in time. As such, the consistency bookmark may be used as a data recovery mechanism.

In operation 216, one or more of the data blocks that are identified by FSD module 122 as modified between the first and second time instants are copied from master server 102 to replica server 106 using, e.g., the de-duplication process discussed above. For example, for each (or at least one) of the identified data blocks, conversion module 126 may compute a representative data block, and determine whether the representative data block is identical to a pre-computed representative data block in memory 110. Responsive to the determination that an identical pre-computed representative data block is available, only the representative data block (i.e., without the actual corresponding identified data block) is sent to replica server 106 via network 104, or otherwise communicated from master server 102 to replica server 106. Otherwise, responsive to the determination that the representative data block is not identical to any of the pre-computed representative data blocks in memory 110, the representative data block is added to memory 110, and both the representative data block and the corresponding identified data block are sent to replica server 106 for replication in storage 140 and/or memory 142. In some implementations, if only the representative data block is communicated from master server 102 to replica server 106, replica server 106 may send a command or signal to master 102 requesting the corresponding identified data block to be sent to master server 102. Accordingly, master server 102, after processing the received command or signal, may send the identified data block to replica server 106. In operation 218, processor 114 is configured to clear out, i.e., delete all the contents of the reserved area of primary storage 108.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A method for data replication from a production server to a backup server, the method comprising:
   identifying a data block that was modified after a first time instant and before a second time instant, wherein a file comprises the data block and the file is stored in a production server;
   computing a representative data block for the identified data block, wherein the representative data block is computed using a cryptography algorithm;
   determining whether the representative data block is identical to one of a plurality of pre-computed representative data blocks; and
   after said determining, sending the representative data block to a backup server.

2. The method of claim 1, wherein said sending the representative data block is performed responsive to a determination that the representative data block is identical to a pre-computed representative data block.

3. The method of claim 2, wherein, responsive to a determination that the representative data block is not identical to any of the plurality of pre-computed representative data blocks, said sending further comprises sending the identified data block to the backup server.

4. The method of claim 3, further comprising adding the representative data block to the plurality of pre-computed representative data blocks.

5. The method of claim 1, further comprising:
   recording, in a memory operatively associated with the production server, an operation performed between the first time instant and the second time instant on a file of a protected directory in the production server; and
   sending the recorded operation to the backup server.

6. The method of claim 5, wherein said sending the recorded operation is performed prior to said sending the representative data block to the backup server.

7. The method of claim 5, wherein said recording further comprises consolidating the operation with a previously recorded operation as the operation is recorded in the memory.

8. The method of claim 5, wherein the operation comprises a truncate, rename, remove, create, write, change security, or change property operation.

9. The method of claim 1, further comprising:
   capturing a snapshot of a protected directory of the production server, wherein the file is associated with the protected directory;
   storing the snapshot in a reserved portion of a memory operatively associated with the production server; and
   sending a point in time of the capturing of the snapshot to the backup server.

10. The method of claim 9, wherein the point in time of the capturing of the snapshot is the first time instant.

11. The method of claim 9, wherein the snapshot comprises metadata and data blocks of files of the protected directory.

12. The method of claim 9, further comprising storing original data of the identified data block as part of the snapshot in the reserved portion of the memory.

13. The method of claim 9, further comprising deleting all contents of the reserved portion of the memory following said sending the representative data block.

14. The method of claim 9, wherein said capturing a snapshot is performed periodically.

15. The method of claim 1, wherein the cryptography algorithm comprises Message-Digest algorithm 5 (MD5) or a Secure Hash Algorithm (SHA), and wherein the representative data block comprises a hash value computed using the cryptography algorithm.

16. A system for data replication from a production server to a backup server, the system comprising:
   a processor configured to:
      identify a data block that was modified after a first time instant and before a second time instant, wherein a file comprises the data block and the file is stored in a production server;
      compute a representative data block for the identified data block, wherein the representative data block is computed using a cryptography algorithm;
      determine whether the representative data block is identical to one of a plurality of pre-computed representative data blocks; and
      after said determination, send the representative data block to a backup server.

17. The system of claim 16, wherein the processor is further configured to:
   determine whether the representative data block is identical to one of a plurality of pre-computed representative data blocks, wherein the plurality of pre-computed representative data blocks is stored in a memory operatively associated with the production server, and
   send the representative data block responsive to a determination that the representative data block is identical to a pre-computed representative data block.

18. The system of claim 17, wherein, responsive to a determination that the representative data block is not identical to any of the plurality of pre-computed representative data blocks, the processor is further configured to send the identified data block to the backup server.

19. The system of claim 18, wherein the processor is further configured to add the representative data block to the plurality of pre-computed representative data blocks.

20. The system of claim 16, wherein the processor is further configured to:
record, in a memory operatively associated with the production server, an operation performed between the first time instant and the second time instant on a file of a protected directory in the production server; and
send the recorded operation to the backup server.

21. The system of claim 20, wherein the processor is further configured to send the recorded operation prior to sending the representative data block to the backup server.

22. The system of claim 20, wherein the processor is further configured to consolidate the operation with a previously recorded operation as the operation is recorded in the memory.

23. The system of claim 20, wherein the operation comprises a truncate, rename, remove, create, write, change security, or change property operation.

24. The system of claim 16, wherein the processor is further configured to:
capture a snapshot of a protected directory in the production server, wherein the file is associated with the protected directory;
store the snapshot in a reserved portion of a memory operatively associated with the production server; and
send a point in time of the capturing of the snapshot to the backup server.

25. The system of claim 24, wherein the point in time of the capturing of the snapshot is the first time instant.

26. The system of claim 24, wherein the snapshot comprises metadata and data blocks of files of the protected directory.

27. The system of claim 24, wherein processor is further configured to store original data of the identified data block as part of the snapshot in the reserved portion of the memory.

28. The system of claim 24, wherein the processor is further configured to delete all contents of the reserved portion of the memory after the representative data block is sent to the backup server.

29. The system of claim 24, wherein the processor is further configured to capture a snapshot periodically.

30. The system of claim 16, wherein the cryptography algorithm comprises Message-Digest algorithm 5 (MD5) or a Secure Hash Algorithm (SHA), and wherein the representative data block comprises a hash value computed using the cryptography algorithm.

31. A computer program product comprising:
a non-transitory computer readable storage medium storing information, the stored information comprising:
instructions configured to cause a computing device to:
identify a data block that was modified after a first time instant and before a second time instant, wherein a file comprises the data block and the file is stored in a production server;
compute a representative data block for the identified data block, wherein the representative data block is computed using a cryptography algorithm;
determine whether the representative data block is identical to one of a plurality of pre-computed representative data blocks; and
after said determination, send the representative data block to a backup server.

32. The computer program product of claim 31, further comprising instructions configured to cause a computing device to:
send the representative data block responsive to a determination that the representative data block is identical to a pre-computed representative data block.

33. The computer program product of claim 32, further comprising instructions configured to cause a computing device to, responsive to a determination that the representative data block is not identical to any of the plurality of pre-computed representative data blocks, send the identified data block to the backup server.

34. The computer program product of claim 31, further comprising instructions configured to cause a computing device to:
record, in a memory operatively associated with the production server, an operation performed between the first time instant and the second time instant on a file of a protected directory in the production server; and
send the recorded operation to the backup server.

35. The computer program product of claim 31, further comprising instructions configured to cause a computing device to:
capture a snapshot of a protected directory of the production server, wherein the file is associated with the protected directory;
store the snapshot in a reserved portion of a memory operatively associated with the production server; and
send a point in time of the capture of the snapshot to the backup server.

* * * * *